United States Patent
Mandon

[11] Patent Number: 6,129,326
[45] Date of Patent: Oct. 10, 2000

[54] ADHESIVE SHOCK ABSORBER

[75] Inventor: Stephane L. Mandon, La Murette, France

[73] Assignee: Caterpillar Inc., Peoria, Ill.

[21] Appl. No.: 08/813,221

[22] Filed: Mar. 7, 1997

[51] Int. Cl.$^7$ ............ F16B 43/02; E02D 27/34; E04B 1/98; F16M 3/00
[52] U.S. Cl. ............ 248/632; 248/638; 411/544; 411/900; 428/626
[58] Field of Search ............ 248/632, 638; 29/525.12, 525.13, 469.5; 428/625, 626; 52/167.7, 167.8; 411/544, 900

[56] References Cited

U.S. PATENT DOCUMENTS

| | | | |
|---|---|---|---|
| 2,081,213 | 5/1937 | Anibal | 248/632 |
| 4,195,713 | 4/1980 | Hagbjer et al. | 188/1 B |
| 4,333,222 | 6/1982 | Melin | 29/525.12 X |
| 4,699,180 | 10/1987 | Stefan et al. | 248/638 X |
| 4,744,539 | 5/1988 | Stimeling | 248/638 |
| 4,819,503 | 4/1989 | Fazi, Jr. et al. | 74/574 |
| 4,933,238 | 6/1990 | Fukahori et al. | 428/495 |
| 5,228,664 | 7/1993 | Moulinet | 248/632 X |
| 5,300,355 | 4/1994 | Mifune et al. | 428/215 |
| 5,489,180 | 2/1996 | Ichihara et al. | 52/167.7 X |
| 5,665,187 | 9/1997 | Mackellar | 29/525.13 X |

FOREIGN PATENT DOCUMENTS

| | | | |
|---|---|---|---|
| 1441134 | 11/1988 | Russian Federation | 248/638 |
| 135942 | 5/1989 | Russian Federation | 248/638 |
| 1670289 | 8/1991 | Russian Federation | 248/638 |
| 362470 | 11/1931 | United Kingdom | 248/632 |

*Primary Examiner*—Joseph M. Gorski
*Attorney, Agent, or Firm*—Diana L. Charlton

[57] ABSTRACT

Bolted mounting assemblies for use between two mounted components wherein one of the components experiences vibration typically use rubber shock absorbers to dampen the vibration transfer between the components. The rubber shock absorbers are expensive and complicated to manufacture and are limited in flexibility control. The present invention overcomes this and other problems by providing an adhesive with damping capabilities between washers in a bolt assembly. The bolt assembly is used to mount first and second components with the washers therebetween. The adhesive is spaced a predetermined distance from a longitudinal axis of a bolt and has a non-uniform thickness which increases as the distance from the longitudinal axis increases to provide protection from bending loads about the axis. The washers with adhesive form a washer assembly with damping and flexibility characteristics controlled through variations in the design. The washer assembly provides a simple, inexpensive shock absorber between two components which experience vibration to substantially eliminate vibration transfer therebetween.

5 Claims, 3 Drawing Sheets

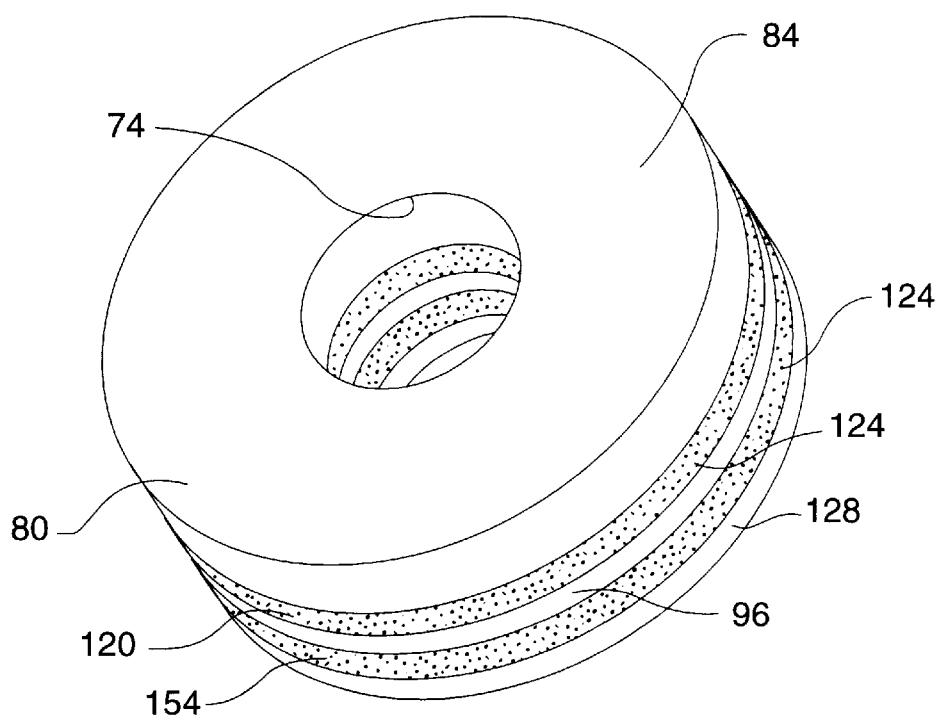
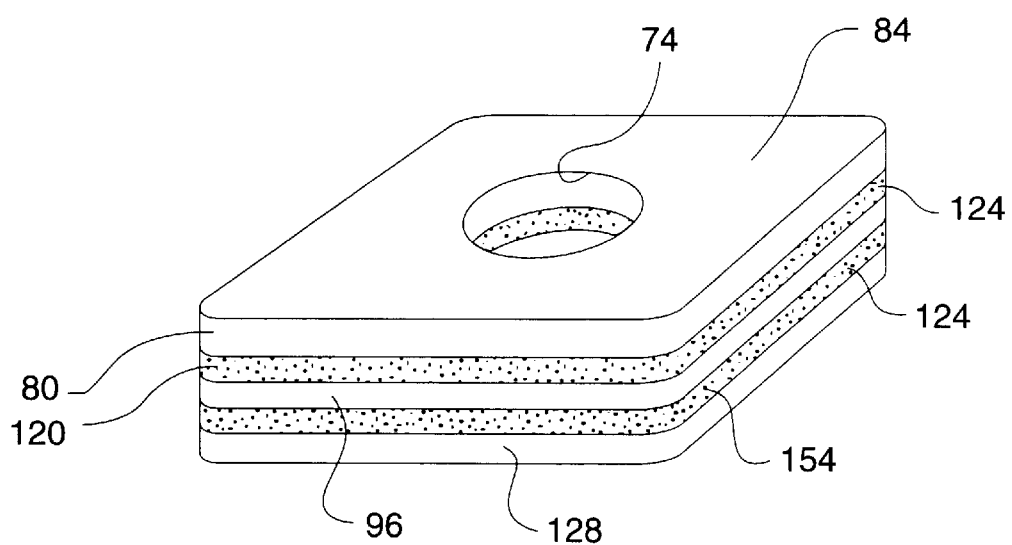

ADHESIVE SHOCK ABSORBER

TECHNICAL FIELD

This invention relates generally to a bolted mounting assembly between two components and more particularly to an energy absorbing adhesive within the bolted mounting assembly which minimizes vibration transfer between the components.

BACKGROUND ART

Bolted assemblies may be used between two mounted components, such as a frame and an enclosure, on a construction machine. Typically, these mounted components must withstand substantial vibration occurring therebetween which produces axial and bending loads. Therefore, an elastomeric material, such as a rubber shock absorber, is used in conjunction with the bolted assembly to reduce the vibration transfer from one component to the other. Unfortunately, significant manufacturing costs are incurred in utilizing the rubber shock absorbers due to the necessary tooling and mold requirements of producing elastomeric materials. Additionally, rubber shock absorbers often are too flexible between the components, lowering the natural frequency of the component which limits the vibration control of the rubber shock absorbers. Furthermore, the increased use of composites in construction machine components increases the need to control the vibration transfer therebetween in order to prolong the life of the composite material.

An example of a damping material used between a metallic constraining plate and a vibration source is disclosed in U.S. Pat. No. 5,300,355 issued to Naoto Mifune et al. on Apr. 5, 1994. This design relates to utilization of a magnetic composite type damping material constructed by bonding an adhesive elastic sheet containing magnetic powder to a constraining plate such as a metal plate by using an adhesive composed of rubber elastomer, adhesive resin, plasticizer, magnetic powder, etc. The design of Mifune et al. is attracted by magnetic force against a vibration source and exhibits vibration damping properties in a wide temperature range due to the synergism of the magnetic and adhering forces. The design of Mifune et al. is utilized between two planar components to mainly control shear loads and vibration concerns therefrom. The damping material would not be preferable in an environment which includes axial and bending loads. Additionally, the design of Mifune et al. would not be used with a bolted mounting assembly since the adhesive elastic sheet utilized produces a clamping effect without any mechanical devices, such as a bolt. The clamping effect of the adhesive elastic sheet would generally not withstand large stresses and would not provide the high torque requirements necessary on mounted components on a construction machine.

The present invention is directed to overcoming the problems as set forth above.

DISCLOSURE OF THE INVENTION

In one aspect of the present invention, an energy absorbing assembly mounts first and second components. The first component has upper and lower surfaces which define an opening therethrough. The second component has an upper surface which defines an opening extending therein. The opening in the first component is positioned coaxially with the opening in the second component. A first member has substantially planar upper and lower surfaces which define an opening therethrough. The upper surface of the first member is positioned adjacent the lower surface of the first component with the opening of the first member coaxial with the opening of the first component. A second member has upper and lower surfaces which define an opening therethrough. A first predetermined portion of the upper surface of the second member diverges outwardly toward the lower surface of the second member to define a space between the lower surface of the first member and the first portion of the upper surface of the second member. A second portion of the upper surface of the second member is positioned adjacent the lower surface of first member and the lower surface of the second member is positioned adjacent the upper surface of the second component. The opening of the second member is coaxial with the opening of the second component. A threaded fastener has a longitudinal axis, an elongated body portion which extends through the openings in the first component, the first member and the second member and into the opening within the second component and a head portion seated against the upper surface of the first component. An adhesive is disposed within the space between the lower surface of the first member and the first portion of the upper surface of the second member.

In another aspect of the present invention, a bolt assembly includes a flat washer which has upper and lower planar surfaces defining an opening therethrough. A bevel washer has upper and lower surfaces which define an opening therethrough and is positioned with a first planar portion of the upper surface of the bevel washer adjacent the lower surface of the flat washer. A second portion of the upper surface of the bevel washer diverges outwardly a predetermined distance toward the lower surface of the bevel washer to define a space between the lower surface of the flat washer and the second portion of the upper surface of the bevel washer. The opening of the bevel washer is coaxial with the opening of the flat washer. A bolt has a longitudinal axis, an elongated body portion which extends through the openings in the flat washer and the bevel washer and a head portion seated against the upper surface of the flat washer. An adhesive is disposed within the space between the lower surface of the flat washer and the second portion of the upper surface of the bevel washer.

In yet another aspect of the present invention, a washer assembly includes a flat washer which has upper and lower planar surfaces defining an opening therethrough. A bevel washer has upper and lower surfaces which define an opening therethrough and is positioned with a first planar portion of the upper surface of the bevel washer adjacent the lower surface of the flat washer. A second portion of the upper surface of the bevel washer diverges outwardly a predetermined distance toward the lower surface of the bevel washer to define a space between the lower surface of the flat washer and the second portion of the upper surface of the bevel washer. The opening of the bevel washer is coaxial with the opening of the flat washer. An adhesive is disposed within the space between the lower surface of the flat washer and the second portion of the upper surface of the bevel washer.

In yet another aspect of the present invention, a method of mounting first and second components to substantially eliminate vibration transfer therebetween is disclosed. The first step is to apply an adhesive to a first inclined portion of an upper surface of a bevel washer. Next, attach a flat washer which defines an opening therethrough at a first portion of a lower surface to a second planar portion of the upper surface of the bevel washer which defines an opening therethrough so that a second portion of the lower surface of the flat washer is in contact with the adhesive and the openings of the bevel washer and the flat washer are coaxially aligned. Then, allow the adhesive to cure between the second portion of the lower surface of the flat washer and the first portion of the upper surface of the bevel washer to bind the flat washer and the bevel washer together thereby defining the washer assembly which defines a joint opening therethrough. Next, place the washer assembly on an upper surface of the second component so that the joint opening of the washer assembly is coaxially aligned with a defined opening within the second component. Then, align a lower surface of the first component with the upper surface of the second component and contact the lower surface of the first component with an upper surface of the washer assembly so that a defined opening through the first component is coaxially aligned with the joint opening in the washer assembly and the opening within the second component. Then, threading an elongated body portion of a fastener with a longitudinal axis through the openings of the first component and the washer assembly and into the opening within the second component until a head portion of the fastener seats against a portion of an upper surface of the first component and the first component, second component and washer assembly are securely attached. Next, vibrating the second component. Finally, damping the vibration from the second component within the adhesive in the washer assembly so that vibration from the second component is substantially not transferred to the first component.

The present invention, through the use of a energy absorbing assembly which is simple and easy to manufacture, provides a means for substantially eliminating vibration transfer between two mounted components.

BRIEF DESCRIPTION OF THE DRAWINGS

FIG. 4 is a three dimensional view of a washer portion of the present invention; and FIG. 5 is a three dimensional view of a washer portion of an alternate embodiment of the present invention.

BEST MODE FOR CARRYING OUT THE INVENTION

Figure 1:
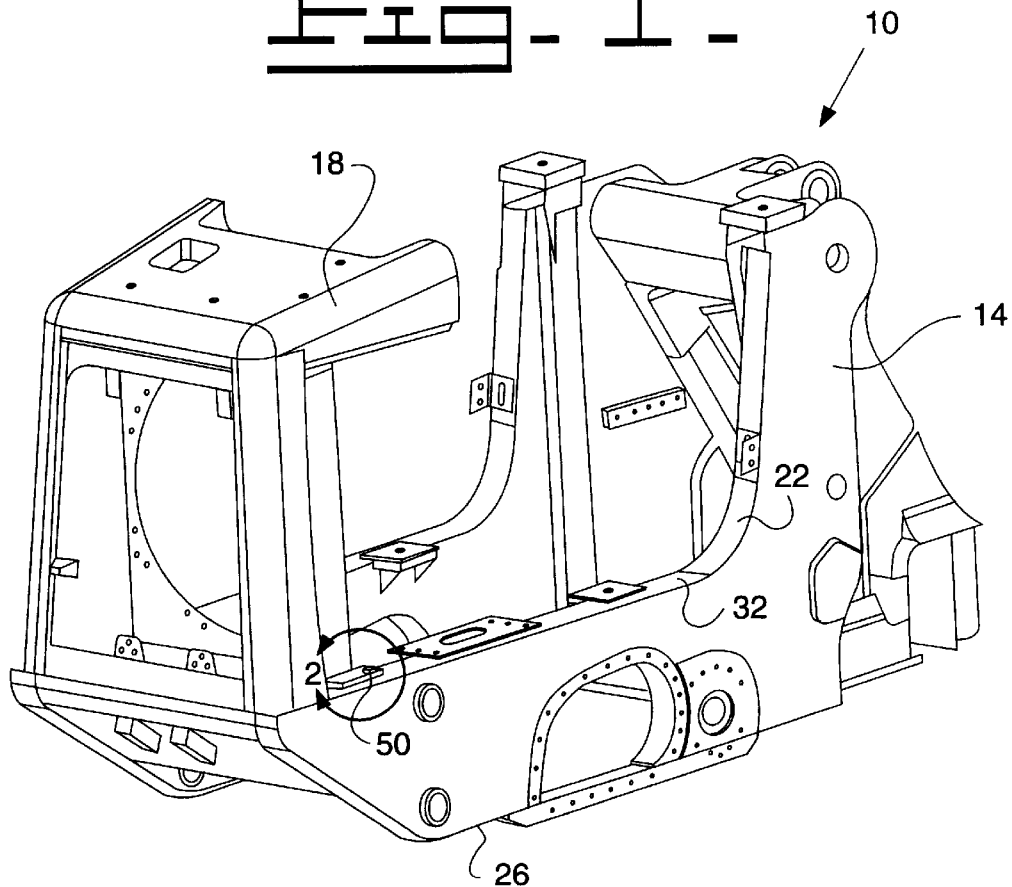
FIG. 1 is a perspective view of a frame assembly for a construction machine embodying the present invention.
Figure 2:
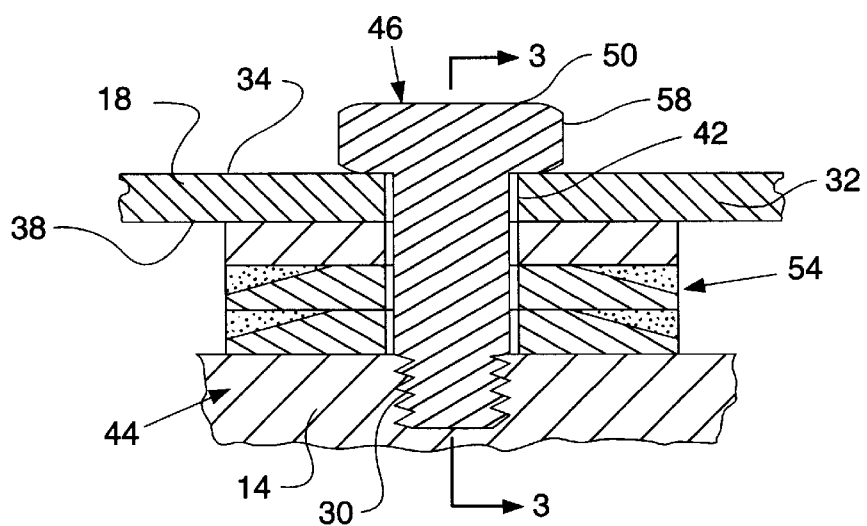
FIG. 2 is an enlarged section view taken along line 2—2 of FIG. 1.
Figure 3:
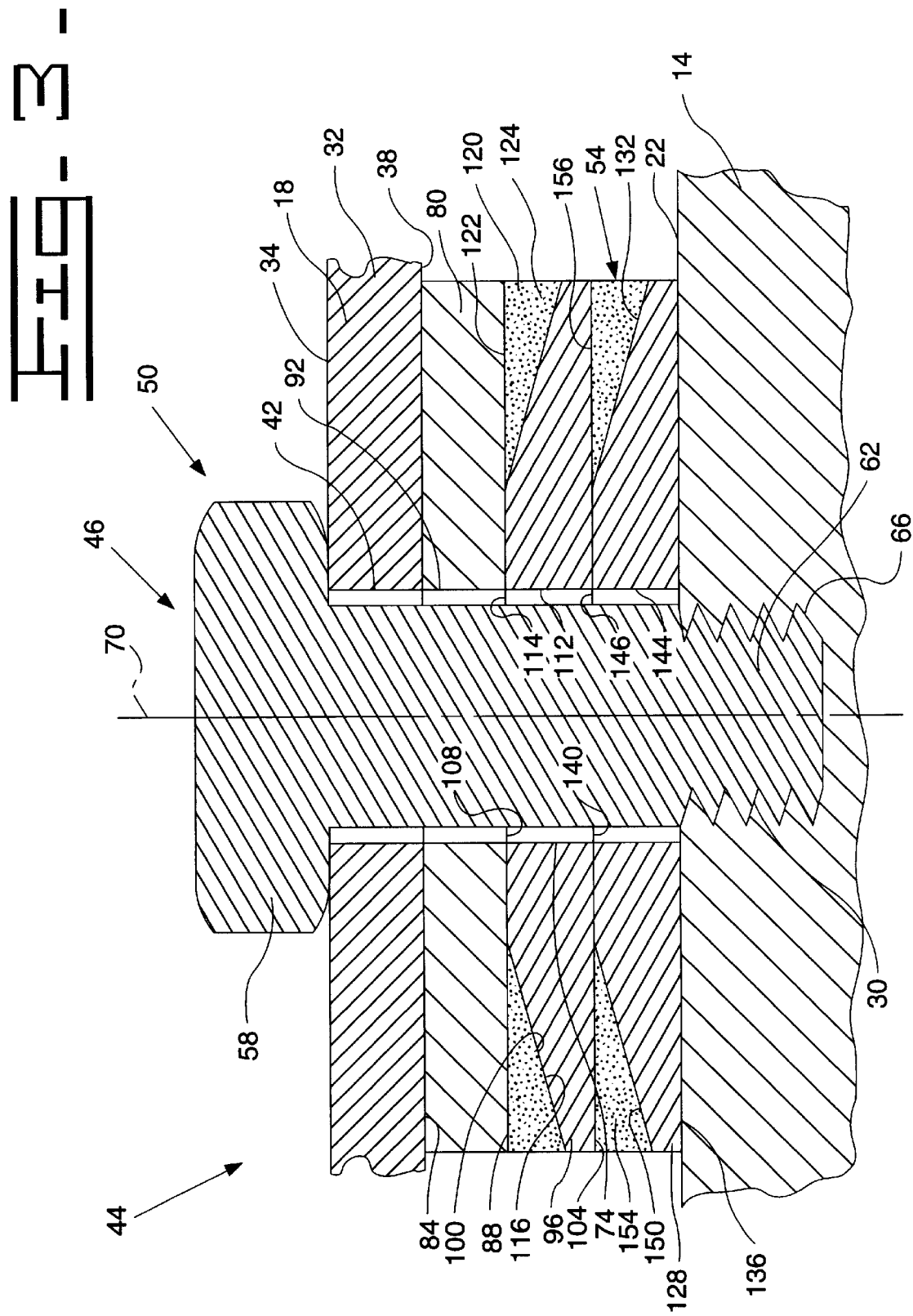
FIG. 3 is a section view taken along line 3—3 of FIG. 2.

A structural assembly 10 for a construction machine (not shown) with a frame assembly 14 and a hood assembly 18 is shown in FIG. 1. Although a frame assembly 14 and hood assembly 18 are used in conjunction with the present invention, it should be understood that any mounted components may be utilized. The frame assembly 14 has upper and lower surfaces 22,26. A tapped bore 30 is defined from the upper surface 22 and extends a predetermined distance into the frame assembly 14. The hood assembly 18 has a mounting flange 32 with upper and lower surfaces 34,38 which define a hole 42 therethrough. A method of mounting 44 the hood assembly 18 and the frame assembly 14 is provided through the use of a bolt assembly 46. The lower surface 34 of the hood assembly 14 is mounted in close proximity to the upper surface 22 of the frame assembly 14. The bolt assembly 46 passes through the hole 42 of the mounting flange 32 and into the bore 30 within the frame assembly 14. The hole 42 in the mounting flange 32 is substantially coaxially aligned with the tapped bore 30 within the frame assembly 14 prior to mounting.

Referring more specifically to FIGS. 2–5, the bolt assembly 46 includes a threaded bolt 50 of any suitable type and a washer assembly 54. The bolt 50 has a head portion 58 and an elongated body 62 extending from the head portion with a portion 66 thereof being threaded. The bolt 50 has a longitudinal axis 70 passing therethrough. The washer assembly 54 is positioned between the frame assembly 14 and the hood assembly 18 and has an opening 74 therethrough substantially coaxially aligned with the tapped bore 30 within the frame assembly 14 and hole 42 in the mounting flange 32 of the hood assembly 18. The elongated body 62 of the bolt 50 passes through the hole 42 in the mounting flange 32 and the opening 74 through the washer assembly 54 with the threaded portion 66 threaded into the tapped bore 30 within the frame assembly 14 in a conventional manner for tightening the head portion 58 of the bolt 50 against the upper surface 34 of the mounting flange 32.

The washer assembly 54 includes a flat metallic washer 80 of any suitable type, including any geometrical shape as shown more specifically in FIG. 5. The flat washer 80 has upper and lower planar surfaces 84,88 with an opening 92 defined therethrough. A first metallic bevel washer 96 of any suitable type, including any geometrical shape as shown more specifically in FIG. 5, has an upper surface 100 and a lower planar surface 104. A first portion 108 of the upper surface 100 and the lower planar surface 104 of the first bevel washer 96 define an opening 112 therethrough. The first portion 108 of the upper surface 100 of the first bevel washer 96 is planar and extends a predetermined distance from the longitudinal axis 70 of the bolt 50. The first portion 108 of the upper surface 100 of the first bevel washer 96 is adjacent and in contact with a first portion 114 of the lower planar surface 88 of the flat washer 80 so that the opening 112 of the first bevel washer 96 is coaxially aligned with the opening 92 of the flat washer 80. A second portion 116 of the upper surface 100 of the first bevel washer 96 diverges outwardly a predetermined distance and angle from the first portion 108 of the upper surface 100 of the first bevel washer 96 toward the lower planar surface 104 of the first bevel washer 96. It should be understood that the second portion 116 may be inclined from 20 to 40 degrees from the first portion 108. A first space 120 is defined between a second portion 122 of the lower planar surface 88 of the flat washer 80 and the second portion 116 of the upper surface 100 of the first bevel washer 96. An energy absorbing adhesive 124, such as epoxy mono or bicomponent, with a substantial temperature range from −55 C to +120 C, an approximate shear capacity of around 20 Mpa and a density approaching 1.1 to 1.3 is disposed on the second portion 116 of the upper surface 100 of the first bevel washer 96 to substantially enclose the space 120 and is attached to the second portion 122 of the lower planar surface 88 of the flat washer 80. The adhesive 124 is spaced a predetermined distance from the longitudinal axis 70 of the bolt 50. A second metallic bevel washer 128 of any suitable type, including any geometrical shape as shown more specifically in FIG. 5, has an upper surface 132 and a lower planar surface 136. A first portion 140 of the upper surface 132 and the lower planar surface 136 of the second bevel washer 128 define an opening 144 therethrough. The first portion 140 of the upper surface 132 of the second bevel washer 128 is planar and extends a predetermined distance from the longitudinal axis 70 of the bolt 50. The first portion 140 of the upper surface 132 of the second bevel washer 128 is adjacent and in contact with a first portion 146 of the lower planar surface 104 of the first bevel washer 96 so that the opening 144 of the second bevel washer 128 is coaxially aligned with the opening 112 of the first bevel washer 96. A second portion 150 of the upper surface 132 of the second bevel washer 128 diverges outwardly a predetermined distance and angle from the first portion 140 of the upper surface 132 of the second bevel washer 128 toward the lower planar surface 136 of the second bevel washer 128. It should be understood that the second portion 150 may be inclined from 20 to 40 degrees from the first portion 140. A second space 154 is defined between a second portion 156 of the lower planar surface 104 of the first bevel washer 96 and the second portion 150 of the upper surface 132 of the second bevel washer 128. The energy absorbing adhesive 124 used in the first space 120 or of any suitable type is disposed on the second portion 150 of the upper surface 132 of the second bevel washer 128 to substantially enclose the second space 154 and is attached to the second portion 156 of the lower planar surface 104 of the first bevel washer 96. The adhesive 124 is spaced a predetermined distance from the longitudinal axis 70 of the bolt 50. It should be understood that the washer assembly 54 may include successive bevel washers and adhesive as is needed to obtain optimal flexibility characteristics.

INDUSTRIAL APPLICABILITY

During operation of the construction machine (not shown), a significant amount of vibration is experienced within the frame assembly 14. The method of mounting 33 the hood assembly 18 to the frame assembly 14 utilizes the bolt assembly 46 to substantially eliminate vibration transfer from the frame assembly 14 to the hood assembly 18.

The bolt assembly 46 is manufactured so that the adhesive 124 is applied to the second portion 150 of the upper surface 132 of the second bevel washer 128 until it is adjacent and substantially coplanar with the first portion 140 and substantially fills the first space 120. The inclination of the second portion 150 of the upper surface 132 of the second bevel washer 128 ensures a non-uniform thickness of the adhesive 124 within the first space 120. Since the thickness of the adhesive 124 increases as the distance from the longitudinal axis 70 of the bolt 50 increases, the bolt assembly 46 is capable of withstanding maximum bending loads occurring at the longitudinal axis 70 due to the flexibility of the adhesive 124 at the thicker portions. The thickness of the adhesive 124 may be controlled through variations in the length of the first portion 140 of the upper surface 132, the length of the second portion 150 of the upper surface 132 and the inclination of the second portion 150 from the first portion 140. Additionally, the use of the adhesive 124 within the first space 120 acts as a damping source to virtually eliminate the vibration transfer from the frame assembly 14 to the hood assembly 18. Damping capabilities may be controlled through the type of adhesive 124 used and the number of bevel washers within the washer assembly 54. The lower planar surface 104 of the first bevel washer 96 is seated on the first portion 140 of the upper surface 132 of the second bevel washer 128 so that the first portion 146 of the lower planar surface 104 of the first bevel washer 96 and the first portion 140 of the upper surface 132 of the second bevel washer 128 are in contact and so that the second portion 156 of the lower planar surface 104 is in contact with the adhesive 124. The adhesive 124 is applied to the second portion 116 of the upper surface 100 of the first bevel washer 96 until it is adjacent and substantially coplanar with the first portion 108 in the same manner as the adhesive applied to the second bevel washer 128. The lower planar surface 88 of the flat washer 80 is seated on the first planar portion 108 of the upper surface 100 of the first bevel washer 96 so that the first portion 114 of the lower planar surface 88 of the flat washer 80 and the first portion 108 of the upper surface 100 of the first bevel washer 96 are in contact and so that the second portion 122 of the lower planar surface 88 of the flat washer 80 is in contact with the adhesive 124. The adhesive 124 is then cured in any suitable manner between the washers 80,96,128 to bind the washers 80,96,128 together thereby defining the washer assembly 54. Once cured, the washer assembly 54 is placed on the frame assembly 14 so that the lower surface 136 of the second bevel washer 128 is placed on the upper surface 22 of the frame assembly 14. The lower surface 38 of the mounting flange 32 of the hood assembly 18 is brought into contact with the upper surface 84 of the flat washer 80. The hole 43 in the mounting flange 32, the opening 56 in the washer assembly 54 and the tapped bore 30 within the frame assembly 14 are coaxially aligned so that the bolt 50 may be threaded through the openings 43,56,30 and into the tapped bore 30 to secure the structural assembly 10 in a conventional manner to achieve appropriate torque requirements. The contact area of the planar surfaces 84,114,108,146,140, 136 of the washers 80,96,128, the upper planar surface 22 of the frame assembly 14 and the upper and lower planar surfaces 34,38 of the mounting flange 32 of the hood assembly 18 allow for adequate abutment of the bolt 50 to achieve proper torque requirements during assembly.

In view of the above, the use of an adhesive between washers in a bolt assembly provides a simple and inexpensive shock absorber with damping capabilities between two components in a construction machine to substantially eliminate vibration transfer between the components. The adhesive is spaced a predetermined distance from a longitudinal axis of a bolt and has a non-uniform thickness which increases as the distance from the longitudinal axis increases to provide protection from bending loads about the axis. The washers and adhesive form a washer assembly with damping and flexibility characteristics controlled through variations in the design.

What is claimed is:

1. An energy absorbing assembly, comprising:

a first component having upper and lower surfaces defining an opening therethrough;

a second component having an upper surface defining an opening extending therein, the opening in the first component being positioned coaxially with the opening in the second component;

a first metallic member having substantially planar upper and lower surfaces defining an opening therethrough, the upper surface of the first member being seated against the lower surface of the first component with the opening of the first member coaxial with the opening of the first component;

a second metallic member disposed between the first member and the second component and having upper and lower surfaces defining an opening therethrough with a first predetermined portion of the upper surface of the second member diverging outwardly toward the lower surface of the second member, a second portion of the upper surface of the second member being seated against the lower surface of the first member to define a space between the lower surface of the first member and the first portion of the upper surface of the second member with the opening of the second member coaxial with the opening of the second component;

a threaded fastener having a longitudinal axis, an elongated body portion extending through the openings in the first component, the first member and the second member, and into the opening within the second component, and a head portion seated against the upper surface of the first component; and a cured adhesive disposed within and substantially filling the space between the lower surface of the first member and the first portion of the upper surface of the second member.

2. The energy absorbing assembly of claim 1, wherein the adhesive is disposed a predetermined distance from the axis of the threaded fastener within the space between the lower surface of the first member and the first portion of the upper surface of the second member and has a predetermined non-uniform thickness.

3. The energy absorbing assembly of claim 1, wherein a third metallic member is disposed between the second member and the second component and has upper and lower surfaces defining an opening therethrough with a first predetermined portion of the upper surface of the third member diverging outwardly toward the lower surface of the third member, a second portion of the upper surface of the third member being seated against the lower surface of the second member to define a space between the lower surface of the second member and the first portion of the third member and the lower surface of the third member being seated against the upper surface of the second component with the opening of the third member coaxial with the opening of the second member.

4. The energy absorbing assembly of claim 3, wherein a cured adhesive is disposed within and substantially fills the space between the lower surface of the second member and the predetermined portion of the upper surface of the third member.

5. The energy absorbing assembly of claim 4, wherein the adhesive is disposed a predetermined distance from the axis of the threaded fastener within the space between the lower surface of the second member and the predetermined portion of the upper surface of the third member and has a predetermined non-uniform thickness.

\* \* \* \* \*